2,996,388
MARGARINE OIL MANUFACTURE
David Stephen Lindsay, Stocksfield, England, assignor to The Procter & Gamble Company, Cincinnati, Ohio, a corporation of Ohio
No Drawing. Filed Jan. 29, 1959, Ser. No. 789,785
7 Claims. (Cl. 99—118)

This invention relates to the preparation of oils, i.e. fatty matter blends, for use in margarine manufacture.

Margarine consists of an emulsion of two phases, one of these being fatty in nature while the other is aqueous, including for example, milk and salt, as is common practice in margarine manufacture. The physical characteristics of the finished margarine, for example its "spreadability," and its smoothness of texture as felt during melting in the mouth, are to a large extent determined by the characteristics of the fat, which forms the fatty part of the emulsion.

Oils suitable for margarine production may be prepared by corandomizing fatty blends such as that of palm oil and coconut oil, and other similar oils may be corandomized to produce materials that can suitably be used as the fatty part of margarine. However it is sometimes found that the margarine prepared from such corandomized oils has a grainy texture, this defect appearing as a "gritty" or "sandy" feeling during the melting of the margarine in the mouth. This defect is also sometimes found in margarines prepared from oil blends consisting partly of corandomized oils such as the above.

It is an object of the invention to provide an oil suitable for use in margarine manufacture, having the generally recognised desirable characteristics of fatty matter for margarine and being free from the tendency to produce a margarine with the said defect of grainy texture, the margarine oil containing substantial amounts of corandomized blends of at least two fatty oils.

The present invention is based on the discovery that the said tendency towards graininess in margarine prepared from corandomized oil, may be prevented by adding to the corandomized oil a minor amount of unrandomized coconut and/or palm kernel oil.

The invention is an improvement in the process of making an oil suitable for use in margarine manufacture according to which, essentially, at least one oil of the palm oil type is corandomized with at least one oil of the coconut oil type, and the corandomized oil mixture is such that a margarine containing it has the tendency to develop a grainy structure. The improvement according to the invention consists in including with the corandomized oil a minor but sufficient quantity of unrandomized oil of the coconut type to overcome said tendency.

Oils useful as the oil of the coconut type in the corandomized oil mixture include coconut oil, palm kernel oil, babassu oil and any other oil containing substantial amounts of $C_{12}$ and $C_{14}$ fatty acids, while oils useful as the other component of the corandomized oil mixture include palm oil, tallow and hydrogenated oils resembling palm oil in solid fat content such as hydrogenated whale oil, hydrogenated fish oil and hydrogenated vegetable oil.

In the practice of the invention, the oils for corandomization may be selected and blended in proportions determined by the desired melting and firmness characteristics of the finished margarine. If desired the corandomized oil may be blended with other vegetable oils, such as groundnut oil, hydrogenated groundnut oil, hydrogenated soyabean oil and similar oils. The amounts and selection of such oils, if used, would be governed by the desired melting and firmness characteristics of the finished margarine, but should not comprise more than about 45% of the total oil.

Then to this corandomized fatty mix, with or without additional oil as above, there is added a small proportion of unrandomized oil of the coconut type, 5% being usually sufficient although in some cases 1% or 2% may suffice. However, larger amounts than this may be used, even up to 30% of the total oil composition being suitable in certain cases. The factor placing an upper limit on the proportion of coconut type oil to add is the effect on the melting and firmness characteristics of the finished margarine. The addition of too much coconut type oil at this stage results in a margarine too hard at low temperatures such as 50° F. and too soft at high temperatures such as 80° F. and the amounts of these oils to use here should be kept as low as possible consistent with prevention of the graininess.

This final mixture of oils is processed into margarine by conventional methods, i.e. the oil is deodorised and then blended with other ingredients, e.g. milk, salt etc., and chilled and plasticised in suitable equipment.

The following is a tabulated list (Table I) of examples of compositions according to the invention. All the examples gave margarines of smooth texture and no trace of graininess.

*Table I*

[Oil proportions (by weight)]

| | (Percent of total oil compositions) | | | | | | | | | | | | | | | | | | | |
|---|---|---|---|---|---|---|---|---|---|---|---|---|---|---|---|---|---|---|---|---|
| | (1) | (2) | (3) | (4) | (5) | (6) | (7) | (8) | (9) | (10) | (11) | (12) | (13) | (14) | (15) | (16) | (17) | (18) | (19) | (20) |
| Corandomized portion: | | | | | | | | | | | | | | | | | | | | |
| 40/60 palm/coconut | 95 | | | | | | | | | | | | | | | | | | | |
| 50/50 palm/coconut | | 95 | 90 | 85 | 70 | 90 | 85 | 65 | 50 | | 90 | 85 | 82.5 | 70 | | | | | | |
| 58/42 palm/coconut | | | | | | | | | | | | | | | | | 79 | 71.5 | | |
| 60/40 palm/coconut | | | | | | | | | | 50 | | | | | | | | | | |
| 65/35 palm/coconut | | | | | | | | | | | | | | | 77 | 63 | | | 70 | 60 |
| Additional vegetable oil: | | | | | | | | | | | | | | | | | | | | |
| Groundnut | | | 5 | 10 | 25 | | | | | | | | | | | | | | | |
| Hydrogenated groundnut (I.V. 83) | | | | | | 5 | 10 | 30 | | | | | | | | | | | | |
| Hydrogenated soyabean (I.V. 92) | | | | | | | | | 21 | 24 | 5 | 10 | 12.5 | 25 | 18 | 32 | 16 | 23.5 | | |
| Hydrogenated soyabean (I.V. 67) | | | | | | | | | 24 | 21 | | | | | | | | | | |
| Hydrogenated soyabean (I.V. 75) | | | | | | | | | | | | | | | | | | | 25 | 35 |
| Unrandomized coconut oil | 5 | 5 | 5 | 5 | 5 | 5 | 5 | 5 | 5 | 5 | 5 | 5 | 5 | 5 | 5 | 5 | 5 | 5 | 5 | 5 |

In the Table I "58/42 palm/coconut" represents a mixture of 58 parts palm oil with 42 parts coconut oil, taken for corandomizing. Also "I.V. 83" for example, represents an iodine value of 83 as the hydrogenation end point for the appropriate oil.

For comparison, the compositions given in the following Table II lead to margarines which showed a grainy texture. They contained no unrandomized coconut (or similar) oil, but are representative of margarine oils containing corandomized blends. They consequently fall outside the scope of this invention.

*Table II*

[Oil proportions (by weight)]

|  | (Percent of total oil composition) | | | |
| --- | --- | --- | --- | --- |
|  | (1) | (2) | (3) | (4) |
| Corandomized portion: | | | | |
| 50/50 palm/coconut | 100 | | | 86 |
| 60/40 palm/coconut | | 100 | 50 | |
| Additional vegetable oil: | | | | |
| Hydrogenated soyabean (I.V. 92) | | | 34 | 14 |
| Hydrogenated soyabean (I.V. 67) | | | 16 | |

It is seen that items (1), (3) and (4) on Table II resemble items covered by (2), (10) and (13) on Table I, differing by the inclusion of 5% unrandomized coconut oil.

Thus by the practice of this invention, it is possible to make a fatty matter for use in margarine having the generally recognized desirable characteristics of fatty matter for margarine, and being made substantially from corandomized blends of two or more fatty oils that would otherwise tend to produce a margarine showing grainy texture, "grittiness" or "sandiness" during melting in the mouth.

What I claim is:

1. The process for making an oil suitable for margarine manufacture which comprises the steps of corandomizing a mixture consisting essentially, by weight of the mixture, of from 40 to 65 parts of at least one oil selected from the group consisting of palm oil, tallow, hydrogenated whale oil, hydrogenated fish oil, and hydrogenated vegetable oil, said hydrogenated oils resembling palm oil in solid fat content and from 60 to 35 parts of at least one oil of the coconut oil type, and thereafter adding to said corandomized mixture from 1% to 30%, by weight of the total oil, of unrandomized oil of the coconut type.

2. The process according to claim 1 in which the unrandomized oil of the coconut type comprises from 1% to 5% of the total oil.

3. The process according to claim 1 wherein there is additionally added to the corandomized mixture at least one other oil selected from the group consisting of vegetable oils, hydrogenated vegetable oils and mixtures thereof.

4. An oil suitable for use in margarine manufacture comprising a major proportion of a corandomized mixture consisting essentially, by weight of the mixture, of from 40 to 65 parts of at least one oil selected from the group consisting of palm oil, tallow, hydrogenated whale oil, hydrogenated fish oil, and hydrogenated vegetable oil, said hydrogenated oils resembling palm oil in solid fat content and from 60 to 35 parts of at least one oil of the coconut oil type and containing additionally from 1% to 30%, by weight of the total oil, of unrandomized oil of the coconut type.

5. An oil according to claim 4 wherein the unrandomized oil of the coconut type is about 5% by weight of the total oil.

6. An oil according to claim 4 which contains additionally at least one other oil selected from the group consisting of vegetable oils, hydrogenated vegetable oils, and mixtures thereof.

7. An oil according to claim 6 wherein the said other oil comprises not more than 45% by weight of the total oil.

References Cited in the file of this patent

UNITED STATES PATENTS 2,859,119   Cochran et al. _____ Nov. 4, 1958